United States Patent Office 3,707,393
Patented Dec. 26, 1972

3,707,393
COATED PAPER SHEET AND METHOD FOR MAKING
John William McDonald, Wilmington, Del., assignor to E. I. du Pont de Nemours and Company, Wilmington, Del.
No Drawing. Filed Feb. 23, 1971, Ser. No. 118,161
Int. Cl. B32b 29/00
U.S. Cl. 117—76 P          24 Claims

ABSTRACT OF THE DISCLOSURE

A sheet material having heat seal properties is provided by precoating a paper substrate with a mixture comprising (A) a copolymer of ethylene and an alpha, beta ethylenically unsaturated carboxylic acid in which the carboxylic acid groups are partially neutralized, and (B) a copolymer of ethylene and a vinyl alkanoate and from 0 to about 10% of an alpha, beta ethylenically unsaturated carboxylic acid, and applying a top coating of polyvinylidene chloride.

BACKGROUND OF THE INVENTION

Field of the invention

This invention relates to heat sealable, moisture barrier sheet materials adapted for packaging and particularly form-fill packaging, and more particularly, to such sheet material having an exposed top coating of polyvinylidene chloride and an undercoating, underlying said polyvinylidene chloride top coat, comprising a mixture of ethylene copolymers. The precoating is applied as an aqueous dispersion of the stated mixture, followed by drying.

Prior art

Existing flexible sheet materials for form-fill packaging are mainly composed of a flexible paper substrate, such as paper itself or a paper/film laminate, having an inside layer (double coat) of polyvinylidene chloride (PVDC) and an outside coating of heat seal moisture barrier lacquer composed chiefly of a copolymer of ethylene and vinyl acetate. In order for this type of construction to function satisfactorily, it must provide a certain level of moisture barrier protection, have good hot tack of inside coating to inside coating (high hot tack, sometimes referred to as high melt strength, is the ability to form a heat-seal bond that resists cohesive and adhesive failure on application of stress while the bond is still hot from the heat sealing operation), have good heat seal of inside to outside coatings, and have enough grease resistance so that the packaged product does not stain or discolor the package. PVDC double coats (PVDC precoat and PVDC top coat) meet these requirements with excellent performance in some areas and marginal performance in others. Among those marginal characteristics of PVDC which could be improved are poor low temperature flexibility, embrittlement with aging and poor color stability with aging which is believed to occur through reaction of urea compounds in some papers and PVDC to cause "yellowing."

Coatings of a copolymer of ethylene and an alpha, beta ethylenically unsaturated carboxylic acid, such as methacrylic acid, have good color stability with aging and good low temperature flexibility and do not become brittle with aging. However, they have been found to be unsuitable as a precoat for PVDC overcoats due, for example, to poor adhesion between them and PVDC. A coating of a copolymer of ethylene and a vinyl alkanoate, such as vinyl acetate, on the other hand, is not entirely satisfactory as a precoat on paper for PVDC overcoats due to its failure properly to hold down fibers protruding from the paper substrate unless applied in higher coating weights, so that the PVDC overcoat does not adequately cover the fibers and prevent them from wicking moisture into the paper substrate, and also because of marginal adhesion to some very smooth paper substrates like certain glassines and machine glazed papers.

Mixtures of the above two types of ethylene copolymers have been suggested. Thus, in copending application Ser. No. 801,741 filed Feb. 24, 1969 by Thomas Charles Bissot, now abandoned, is disclosed a mixture of an ethylene/vinyl acetate copolymer and an ethylene/methacrylic acid copolymer, the latter serving as an emulsifying agent for the former.

The present invention is based on the discovery that certain mixtures of polymers when applied as a precoat or undercoat for a polyvinylidene chloride topcoat provides a valuable "inside" for the form-fill packaging sheet material which has the excellent performance characteristics of PVDC double coats while providing improved low temperature flexibility and color stability with aging and less embrittlement with aging than PVDC double coats. Moreover, the precoat of the present invention with PVDC top coat provides moisture barrier performance which is, in most cases, better than PVDC double coats, at equal or lower "add on" levels for the precoat.

SUMMARY OF THE INVENTION

According to the present invention there is provided a sheet material, especially adapted for use in form-fill packaging, having heat seal properties, comprising a paper sheet substrate having thereon a first coating comprising a mixture of (A) a copolymer of ethylene and a partially neutralized alpha, beta ethylenically unsaturated carboxylic acid and (B) a copolymer of ethylene and a vinyl alkanoate and from 0 to about 10% of an alpha, beta ethylenically unsaturated carboxylic acid, the proportion, by weight, of A to B being from at least 20 to about 75% of A to from 80 to about 25% of B, based on the combined weight of both, and a second coating, overlying said first coating, of polyvinylidene chloride.

The sheet material of the present invention is provided by applying to a flexible sheet substrate a first coating of an aqueous dispersion comprising a mixture of A and B, drying and coalescing the dispersion coating, and thereafter applying a second coating, overlying said first coating, of polyvinylidene chloride.

DETAILED DESCRIPTION OF THE INVENTION

As stated, the precoating or undercoating of the present invention has as its basic components two ethylene copolymers, referred to herein for convenience as copolymer A and copolymer B.

Copolymer A is a copolymer of ethylene and a partially neutralized alpha, beta ethylenically unsaturated carboxylic acid having at least about 60%, by weight, preferably at least about 80%, by weight, of ethylene, and 0.3 to about 40%, preferably 0.3 to about 20%, by weight, of the acid. In such copolymers from about 10 to about 90%, preferably from about 20 to about 70%, of the acid groups are neutralized with alkali metal ions, especially sodium or potassium. Typical acids are acrylic acid, methacrylic acid, fumaric acid, maleic acid, itaconic acid and aconitic acid. Acid derivatives of the aforesaid, such as esters, amide, anhydrides and the like may also be used as monomers. While these derivatives must be convertible to a free carboxylic acid group prior to formation of the copolymer it is not necessary that all such derivative groups be converted to free carboxyl groups. The preferred acid monomer is methacrylic acid, and is generally present in the copolymer in an amount of from about 5 to about 18%, preferably from about 10 to about 15%, by weight, the balance (from about 82 to about 95%, preferably from about 85 to about 90%) being copolymerized ethylene. Copolymers A generally have a molecular weight (unneutralized) corresponding to a melt index of 10 to 150, and preferably from about 50 to about 120.

Copolymer B may be a copolymer of ethylene and a vinyl alkanoate such as vinyl formate, vinyl acetate, vinyl propionate and vinyl butyrate. Such copolymers will normally contain from about 30 to about 97%, by weight, of copolymerized ethylene and from about 3 to about 70%, by weight, of copolymerizized vinyl alkanoate based on the combined weight of the copolymerized ethylene and vinyl alkanoate. Copolymers of ethylene and vinyl acetate are particularly suitable. Advantageously, such ethylene/vinyl acetate copolymers contain from about 50 to about 90%, preferably from about 60 to about 85%, by weight, of copolymerized ethylene and from about 50 to about 10%, preferably from about 40 to about 15%, by weight, of copolymerized vinyl acetate. Copolymer B may be a copolymer of ethylene, a vinyl alkanoate, such as those mentioned above, and an alpha, beta ethylenically unsaturated carboxylic acid, such as those mentioned above in connection with the discussion of copolymer (A). Such copolymers may contain up to about 10%, by weight, of alpha, beta ethylenically unsaturated carboxylic acid based on the combined weight of the three components, the ethylene and vinyl alkanoate being in the proportions relative to each other set forth above.

These copolymers are generally prepared by high-pressure free-radical catalysis processes. Copolymers prepared by low-pressure coordination catalysis processes are also suitable. Exemplary patents illustrating copolymer preparation are U.S. Pat. 2,703,794 issued to Milton J. Roedel on Mar. 8, 1955 and U.S. Pat. 3,215,657 issued to Aleksander Beresniewicz on Nov. 2, 1965. The molecular weight of useful copolymers can be varied over a wide range. However, the copolymers B generally have molecular weights corresponding to a melt index of 1 to 150, particularly under 25 and preferably from about 2 to about 6. Copolymer melt index is determined as described in ASTM-D-1238-65T.

Copolymers A and B are generally prepared and, in accordance with the present invention, are used in the form of aqueous dispersions. Dispersions of copolymer (A) and of copolymer (B) may be separately prepared and then mixed. Dispersions of copolymer (B) may be prepared by dissolving the copolymer in an organic solvent which is immiscible with water and which has a boiling point of 40–160° C., preferably 80–120° C.; mixing the solution with water and thereafter distilling off the solvent as described in U.S. Pat. 3,347,811 issued Oct. 17, 1967 to Thomas C. Bissot. Dispersions of copolymer (A) with neutralization of carboxylic acid groups may be prepared as described in U.S. Pat. 3,296,172 issued Jan. 3, 1967 to Dennis Light Funck and Vernon Clare Wolff, Jr. On the other hand, a codispersion of copolymer (A) and copolymer (B) with neutralization of carboxylic acid groups of the former may be prepared as described in copending application Ser. No. 801,741 filed Feb. 24, 1969 by Thomas Charles Bissot. The particle size of the dispersed copolymer A in the dispersion should be relatively small, generally from about 0.01 to about 0.2 micron (average) and preferably from about 0.01 to about 0.05 micron, the smaller the particle size the better appears to be the performance. The particle size of copolymer B does not appear to be important but it generally averages from about 0.1 to about 2 microns.

The relative proportions of copolymers (A) and (B) in the coating influence the properties of the coating. In accordance with the broader aspects of the invention, the relative proportions of the two copolymers may range from 20 to about 75%, by weight, of copolymer (A) to from 80 to about 25% of copolymer (B) based on the combined weight of both copolymers. With the preferred system, the relative proportions of copolymer (A) to copolymer (B) is from about 25 to about 75%, especially from about 40 to about 60%, of the former to from about 75 to about 25%, especially from about 60 to about 40%, of the latter.

The precoat of the present invention, applied to the sheet substrate and underlying the PVDC overcoat, provides a good bond between it and the substrate and between it and the PVDC. The precoat and PVDC overcoat has high heat sealability to itself (coating to coating) and to certain ethylene/vinyl acetate lacquer coatings which may be on the opposite side of the substrate (coating to back, or inside to outside in a tubular arrangement), resistance to staining or penetration of the product oils and some moisture barrier improvement to the overall packaging material. Moreover, the combined precoat and PVDC overcoat of the present invention has improved low temperature flexibility, less embrittlement with aging and improved color stability with aging compared to PVDC double coats.

The substrate is, as stated, paper, including glassine, bleached or unbleached sulfite or sulfate papers which may or may not be calendered and paper/film or foil laminates. It is preferred that the substrate have a coating on the side opposite from that of the precoat and PVDC overcoat of this invention (i.e. on the outside in a tubular arrangement) to which the coating of the invention can be heat sealed. A preferred outside coating in this regard is a lacquer composed essentially of an ethylene/vinyl acetate copolymer.

The coatings of the present invention are applied to the substrate in the form of an aqueous dispersion, having a solids content which may range from as low as about 10 to as high as about 60%, by weight, more usually from about 20 to about 50%. The coating weight (dry) is generally from about 0.5 to about 4 or 5 pounds/3000 sq. ft. ream. The means of application are conventional and include smooth rolls followed by air knife, Meyer Rods or gravure metering rolls. The dispersion coating is then heated to remove the water and to coalesce the particles into a substantially continuous film. While drying may be done at room temperature, the action is hastened at temperatures above 100° F. Once water is removed the coating is heated to a temperature required for film formation and this may range from about 110° F. to about 300° F. depending upon the specific copolymers used. In practice, the wet coated substrate is generally subjected to heated air at a temperature desired for film formation and this drys the coating and coalesces the particles.

While the coating composition used in accordance with this invention has been described above as consisting essentially of copolymers A and B, this is not intended to exclude minor amounts of other substances that do not materially alter or detract from the advantageous characteristics thereof. For example, minor amounts of a resin or rosin derivative may be added to modify tack.

The present invention will be more readily understood from a consideration of the following specific examples which are given for the purpose of illustration only and are not to be considered as limiting the scope of the invention in any way.

In Examples 1–9 the precoat blends were prepared by mixing the various dispersions, set forth below in Table 1, with stirring. The precoats were applied as coatings to 30 lb. glassine paper substrate (Deerfield BW) by drawdown with a #0 Meyer Rod, and were dried in a circulating air oven at about 250° F. for 10–15 seconds. A polyvinylidene chloride top coating was applied as a dispersion (61% solids) over said precoat by drawdown using a #6 Meyer Rod and dried in a circulating air oven at 120° C. for 10–15 seconds.

Data on "Tape Test" "Heat Seal" and "TAPPI WVTR" (water vapor transmission rate) are set forth in these examples.

The "Tape Test" was conducted by pressure sealing a strip of pressure sensitive cellophane tape (#710 "Scotch"

Brand pressure-sensitive cellophane tape of 3M Company) to the polyvinylidene chloride coating. After rubbing the tape to insure good contact, the tape was removed by slow pulling and by jerking. Delamination either at the substrate-precoat interface or precoat-top coat (polyvinylidene chloride) interface is noted as failure ("F"). Removal of the tape without such delamination is noted as passing ("P").

Heat seal data were obtained by heat sealing each top coating (polyvinylidene chloride) to itself at 300° F. under 2 p.s.i. for 5 seconds. After cooling, the samples were hand separated and if delamination occurred at either the substrate-precoat or precoat-topcoat interface it is noted as delamination ("D"). However, if no such delamination occurred but failure occurred within the paper substrate it is noted as fiber tear ("F.T.").

Water vapor transmission rate data were determined according to TAPPI water vapor transmission rate test T 464-m-45 (Flat) and the data are set forth in grams per 100 sq. in. per 24 hours.

TABLE 1

| Ex. | Precoat dispersions | Solids weight ratio |
|---|---|---|
| 1 | Ethylene/methacrylic acid, 85/15, 60% neutralization, 20% solids, 0.02-0.04 micron, plus ethylene/vinyl acetate/methacrylic acid, 77/18/5, 50% solids. | 60/40 |
| 2 | Ethylene/methacrylic acid, 89/11, 30% neutralization, 42% solids, 0.1-0.2 micron, plus ethylene/vinyl acetate/methacrylic acid, 77/18/5, 50% solids. | 60/40 |
| 3 | Ethylene/methacrylic acid, 85/15, 60% neutralization, 20% solids, 0.02-0.04 micron, plus ethylene/vinyl acetate/methacrylic acid, 67/28/5, 50% solids. | 50/50 |
| 4 | Ethylene/methacrylic acid, 85/15, 60% neutralization, 20% solids, 0.02-0.04 micron, plus ethylene/vinyl acetate/methacrylic acid, 77/18/5, 50% solids. | 50/50 |
| 5 | Ethylene/methacrylic acid, 85/15, 60% neutralization, 20% solids, 0.02-0.04 micron, plus ethylene/vinyl acetate, 72/28, 50% solids. | 50/50 |
| 6 | Ethylene/methacrylic acid, 85/15, 60% neutralization, 20% solids, 0.02-0.04 micron, plus ethylene/vinyl acetate/methacrylic acid, 77/18/5, 50% solids. | 40/60 |
| 7 | Ethylene/methacrylic acid, 89/11, 30% neutralization, 42% solids, 0.1-0.2 micron, plus ethylene/vinyl acetate/methacrylic acid, 77/18/5, 50% solids. | 40/60 |
| 8 | Ethylene/methacrylic acid, 85/15, 60% neutralization, 20% solids, 0.02-0.04 micron, plus ethylene/vinyl acetate/methacrylic acid, 77/18/5, 50% solids. | 20/80 |
| 9 | Ethylene/methacrylic acid, 85/15, 60% neutralization 20% solids, 0.02-0.04 micron, plus ethylene/vinyl acetate, 72/28, 50% solids. | 20/80 |

The results are tabulated as follows:

TABLE 2

| Example | Tape test | Heat seal | TAPPI WVTR |
|---|---|---|---|
| 1 | P | F.T. | 0.60 |
| 2 | P | F.T. | 0.35 |
| 3 | P | F.T. | 0.53 |
| 4 | P | F.T. | 0.58 |
| 5 | P | D | 0.43 |
| 6 | P | F.T. | 1.0 |
| 7 | P | D | 1.2 |
| 8 | P | D | 0.25 |
| 9 | P | F.T.[1] | 0.53 |

[1] Due at least in part to some direct bonding of the top coating to the substrate. When the composition of this Example 9 is applied to the smooth substrate with a #4 Meyer Rod, there is delamination between the substrate-precoat interface.

The following Examples 10-14 are given for comparison. The procedures used in Examples 1-9 were employed here except that the precoats were, in some cases, also applied with a #4 Meyer Rod ("M.R.") and the precoat dispersions were as follows:

TABLE 3

| Ex. | Precoat dispersions | Solids weight ratio |
|---|---|---|
| 10 | Ethylene/methacrylic acid, 85/15, 60% neutralization, 20% solids, 0.02-0.04 micron. | |
| 11 | Ethylene/methacrylic acid, 89/11, 30% neutralization, 42% solids, 0.1-0.2 micron. | |
| 12 | Ethylene/methacrylic acid, 85/15, 60% neutralization, 20% solids, 0.02-0.04 micron, plus ethylene/vinyl acetate/methacrylic acid, 77/18/5, 50% solids. | 80/20 |
| 13 | Ethylene/methacrylic acid, 85/15, 60% neutralization, 20% solids, 0.02-0.04 micron, plus ethylene/vinyl acetate, 72/28, 50% solids. | 80/20 |
| 14 | Polyvinylidene chloride, 61% solids. | |

The results are tabulated as follows:

TABLE 4

| Example | Precoat M.R. | Tape test | Heat seal | TAPPI WVTR |
|---|---|---|---|---|
| 10 | 0 | F | D | 0.80 |
|  | 4 | F | D | 0.60 |
| 11 |  | 0 | F | D | 0.66 |
| 12 | 0 | F | D | 0.50 |
|  | 4 | F | D | 0.57 |
| 13 |  | 0 | F | D | 0.44 |
| 14 | 0 | P | F.T. | 1.3 |
|  | 4 | P | F.T. | .70 |

The following Examples 15-18 employed the procedures of Examples 10-14 except that the precoat dispersions were applied to machine glazed bleached sulfate paper stock and the precoat dispersions are as set forth in Table 5:

TABLE 5

| Ex. | Precoat dispersion | Solids weight ratio |
|---|---|---|
| 15 | Ethylene/methacrylic acid, 89/11, 30% neutralization, 42% solids, 0.1-0.2 micron, plus 7.5%, by weight, of melamine formaldehyde condensate. | |
| 16 | Ethylene/methacrylic acid, 89/11, 30% neutralization, 42% solids, 0.1-0.2 micron, plus ethylene/vinyl acetate/methacrylic acid, 67/28/5, 50% solids. | 67/33 |
| 17 | Ethylene/methacrylic acid, 85/15, 60% neutralization, 20% solids, 0.02-0.04 micron. | |
| 18 | Ethylene/methacrylic acid, 85/15, 60% neutralization, 20% solids, 0.02-0.04 micron, plus ethylene/vinyl acetate/methacrylic acid, 67/28/5, 50% solids. | 67/33 |

The results are tabulated as follows:

TABLE 6

| Example | Precoat M.R. | Tape test | Heat seal | TAPPI WVTR |
|---|---|---|---|---|
| 15 | 4 | F | D | 0 28 |
| 16 | 0 | P | F.T. | 0 28 |
|  | 4 | P | F.T. | 0 30 |
| 17 | 4 | F | D | 0 33 |
| 18 | 0 | P | F.T. | 0 35 |

What is claimed is:

1. A sheet material comprising a paper sheet substrate having thereon a first coating film comprising a mixture of (A) a copolymer of at least about 60% of ethylene and about 0.3 to about 40% of an alpha, beta ethylenically unsaturated carboxylic acid in which about 10 to about 90% of the acid groups are neutralized with alkali metal ions and (B) a copolymer of about 30 to about 97% of ethylene, about 3 to about 70% of a vinyl alkanoate, based on the combined weight of the copolymerized ethylene and copolymerized vinyl alkanoate, and from 0 to about 10% of an alpha, beta ethylenically unsaturated carboxylic acid, based on the combined weight of the three components, the proportions, by weight, of A to B being from at least 20 to about 75% of A to from 80 to about 25% of B, based on the combined weight of both; and a second coating film, overlying said first coating film, of polyvinylidene chloride.

2. The sheet material of claim 1 wherein the relative proportions of A to B are from about 25 to about 75% of A to from about 75 to about 25% of B.

3. The sheet material of claim 2 wherein the relative proportions of A to B are from about 40 to about 60% of A to from about 60 to about 40% of B.

4. The sheet material of claim 3 wherein, in copolymer A, the alpha, beta, ethylenically unsaturated carboxylic is methacrylic acid.

5. The sheet material of claim 2 wherein, in copolymer A, the alpha, beta, ethylenically unsaturated carboxylic acid is methacrylic acid.

6. The sheet material of claim 1 wherein copolymer A contains at least 80% of copolymerized ethylene.

7. The sheet material of claim 6 wherein, in copolymer A, the alpha, beta, ethylenically unsaturated carboxylic acid is methacrylic acid.

8. The sheet material of claim 7 wherein copolymer A contains from about 82 to about 95% of copolymerized ethylene and from about 5 to about 18% of copolymerized methacrylic acid.

9. The sheet material of claim 7 wherein, in copolymer B, the vinyl alkanoate is vinyl acetate and wherein copolymer B contains from about 50 to about 90% of copolymerized ethylene based on the combined weight of the copolymerized ethylene and copolymerized vinyl acetate.

10. The sheet material of claim 7 wherein, in copolymer B, the vinyl alkanoate is vinyl acetate; wherein the alpha, beta ethylenically unsaturated carboxylic acid referred to in copolymer B is methacrylic acid, and wherein copolymer B contains from about 50 to about 90% of copolymerized ethylene based on the combined weight of the copolymerized ethylene and copolymerized vinyl acetate.

11. The sheet material of claim 6 wherein, in copolymer B, the vinyl alkanoate is vinyl acetate and wherein copolymer B contains from about 50 to about 90% of copolymerized ethylene based on the combined weight of the copolymerized ethylene and copolymerized vinyl acetate.

12. The sheet material of claim 1 wherein, in copolymer A, the alpha, beta, ethylenically unsaturated carboxylic acid is methacrylic acid.

13. The sheet material of claim 1 wherein, in copolymer B, the vinyl alkanoate is vinyl acetate and wherein copolymer B contains from about 50 to about 90% of copolymerized ethylene based on a combined weight of the copolymerized ethylene and copolymerized vinyl acetate.

14. The sheet material of claim 13 wherein copolymer B contains from about 60 to about 85% of copolymerized ethylene.

15. The sheet material of claim 14 wherein the alpha, beta, ethylenically unsaturated carboxylic acid referred to in copolymer B is methacrylic acid.

16. The sheet material of claim 13 wherein the alpha, beta, ethylenically unsaturated carboxylic acid referred to in copolymer B is methacrylic acid.

17. The sheet material of claim 1 wherein the alpha, beta, ethylenically unsaturated carboxylic acid referred to in copolymer B is methacrylic acid.

18. The method which comprises applying to a paper sheet a first coating of a mixture, in the form of an aqueous dispersion, of (A) a copolymer of at least about 60% of ethylene and about 0.3 to about 40% of an alpha, beta ethylenically unsaturated carboxylic acid in which about 10 to about 90% of the acid groups are neutralized with alkali metal ions and (B) a copolymer of about 30 to about 97% of ethylene, about 3 to about 70% of a vinyl alkanoate, based on the combined weight of the copolymerized ethylene and copolymerized vinyl alkanoate, and from 0 to about 10% of an alpha, beta ethylenically unsaturated carboxylic acid, based on the combined weight of the three components, the proportion, by weight, of A to B being from at least 20 to about 75% of A to from 80 to about 25% of B, based on the combined weight of both; heating said coating to remove water and coalesce the particles into a substantially continuous film; and thereafter applying to said first coating film an overcoating film of polyvinylidene choride.

19. The method of claim 18 wherein, in said aqueous particle dispersion, copolymer A has an average particle size of from about 0.01 to about 0.2 micron.

20. The method of claim 19 wherein the average particle size of copolymer A is from about 0.01 to about 0.05 micron.

21. The method of claim 20 wherein, the alpha, beta ethylenically unsaturated carboxylic acid in copolymer A is methacrylic acid; wherein in copolymer B, the vinyl alkanoate is vinyl acetate, and wherein copolymer B contains from about 50 to about 90% of copolymerized ethylene based on the combined weight of the copolymerized ethylene and copolymerized vinyl acetate.

22. The method of claim 20 wherein copolymer A contains at least 80% of copolymerized ethylene wherein, in copolymer A, the alpha, beta ethylenically unsaturated carboxylic acid is methacrylic acid; wherein, in copolymer B, the vinyl alkanoate is vinyl acetate; wherein copolymer B contains from about 60 to about 85% of copolymerized ethylene based on the combined weight of the copolymerized ethylene and copolymerized vinyl acetate, and wherein, the alpha, beta ethylenically unsaturated carboxylic acid referred to in copolymer B is methacrylic acid.

23. The method of claim 19 wherein, in copolymer A, the alpha, beta ethylenically unsaturated acid is methacrylic acid; wherein, in copolymer B, the vinyl alkanoate is vinyl acetate, and wherein copolymer B contains from about 50 to about 90% of copolymerized ethylene based on the combined weight of the copolymerized ethylene and the copolymerized vinyl acetate.

24. The method of claim 19 wherein copolymer A contains at least 80% of copolymerized ethylene wherein, in copolymer A, the alpha, beta ethylenically unsaturated carboxylic acid is methacrylic acid; wherein, in copolymer B, the vinyl alkanoate is vinyl acetate; wherein copolymer B contains from about 60 to about 85% of copolymerized ethylene based on the combined weight of the copolymerized ethylene and copolymerized vinyl acetate, and wherein the alpha, beta ethylenically unsaturated carboxylic acid referred to in copolymer B is methacrylic acid.

References Cited
UNITED STATES PATENTS

| | | | |
|---|---|---|---|
| 3,487,036 | 12/1969 | Bissot | 260—27 R |
| 3,264,272 | 8/1966 | Rees | 161—250 X |
| 3,502,475 | 3/1970 | Kane | 117—76 F X |
| 3,532,535 | 10/1970 | Bleyle et al | 117—76 F X |
| 3,306,766 | 2/1967 | Hathaway et al. | 117—76 P |

RALPH HUSACK, Primary Examiner

U.S. Cl. X.R.

117—68, 122 H; 156—218; 161—250, 251